United States Patent
Kuo

(10) Patent No.: US 9,185,634 B2
(45) Date of Patent: *Nov. 10, 2015

(54) METHOD AND APPARATUS FOR ENHANCING RECEIVING EFFICIENCY OF AN MULTIMEDIA BROADCAST MULTICAST SERVICE IN A WIRELESS COMMUNICATIONS SYSTEM

(71) Applicant: INNOVATIVE SONIC LIMITED, Port Louis (MU)

(72) Inventor: Richard Lee-Chee Kuo, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 104 days.

This patent is subject to a terminal disclaimer.

(21) Appl. No.: 13/662,943

(22) Filed: Oct. 29, 2012

(65) Prior Publication Data

US 2013/0051305 A1 Feb. 28, 2013

Related U.S. Application Data

(63) Continuation of application No. 12/104,444, filed on Apr. 17, 2008, now Pat. No. 8,300,566.

(60) Provisional application No. 60/912,172, filed on Apr. 17, 2007.

(51) Int. Cl.
*H04B 7/216* (2006.01)
*H04W 48/12* (2009.01)
*H04W 4/06* (2009.01)

(52) U.S. Cl.
CPC .......... *H04W 48/12* (2013.01); *H04W 4/06* (2013.01)

(58) Field of Classification Search
USPC .......... 370/312–335, 343–390, 436–465; 455/436–465, 506–515
See application file for complete search history.

(56) References Cited

U.S. PATENT DOCUMENTS

| | | | | |
|---|---|---|---|---|
| 7,499,435 | B2 * | 3/2009 | Kwak et al. | 370/337 |
| 7,515,922 | B2 * | 4/2009 | Kim et al. | 455/515 |
| 7,787,893 | B2 * | 8/2010 | Jeong et al. | 455/464 |
| 8,000,303 | B2 * | 8/2011 | Jeong et al. | 370/335 |
| 8,068,465 | B2 * | 11/2011 | Zhang et al. | 370/335 |
| 2006/0280262 | A1 * | 12/2006 | Malladi | 375/299 |
| 2008/0049749 | A1 * | 2/2008 | Xiao et al. | 370/390 |
| 2008/0132263 | A1 * | 6/2008 | Yu et al. | 455/515 |
| 2008/0232396 | A1 * | 9/2008 | Buckley et al. | 370/465 |
| 2009/0147717 | A1 * | 6/2009 | Cai | 370/312 |
| 2010/0027501 | A1 * | 2/2010 | Fukuoka et al. | 370/330 |
| 2011/0070905 | A1 * | 3/2011 | Kazmi et al. | 455/507 |

* cited by examiner

*Primary Examiner* — Man Phan
(74) *Attorney, Agent, or Firm* — Blue Capital Law Firm, P.C.

(57) ABSTRACT

A method for enhancing receiving efficiency of a multimedia broadcast multicast service, know as MBMS, in a wireless communications system includes setting an indicator for indicating whether an MBMS service is transmitted on an MBSFN, an abbreviation of MBMS over a Single Frequency Network, carrier or not, and sending the indicator to a user equipment of the wireless communications system.

4 Claims, 4 Drawing Sheets

METHOD AND APPARATUS FOR ENHANCING RECEIVING EFFICIENCY OF AN MULTIMEDIA BROADCAST MULTICAST SERVICE IN A WIRELESS COMMUNICATIONS SYSTEM

CROSS-REFERENCE TO RELATED APPLICATIONS

This application is a Continuation of U.S. patent application Ser. No. 12/104,444, filed on Apr. 17, 2008, now U.S. Pat. No. 8,300,566, which claims the benefit of U.S. Provisional Application Ser. No. 60/912,172, filed Apr. 17, 2007, the entire disclosures of which are incorporated herein by reference.

FIELD

The present invention relates to a method and related communications device for enhancing receiving efficiency of a multimedia broadcast multicast service (MBMS) in a wireless communications system, and more particularly to a method and related communications device for avoiding waste of processing resources and power in a user equipment (UE) of a wireless communications system.

BACKGROUND

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. To enhance multimedia performance of the 3G mobile telecommunications system, the 3.sup.rd Generation Partnership Project (3GPP) provides a Multimedia Broadcast Multicast Service (MBMS), which is a point-to-multipoint bearer service established on an existing network architecture of the Universal Mobile Telecommunications System (UMTS). MBMS utilizes Internet Protocol (IP) packets as a medium, so that MBMS allows a single source entity to transmit data to multiple user entities simultaneously.

For improving performance of MBMS service broadcasting, a change request R2-071334 to a radio resource control (RRC) specification 3GPP TS 25.331 V7.3.0 (release-7) introduces a single frequency network (SFN) operation for MBMS transmission to reduce service interruption due to frequency switching during transmissions. In addition, a change request R2-071331 provides three kinds of network deployments of MBSFN (MBMS over a Single Frequency Network):

1. A time division duplex (TDD) carrier supports a mixed service of unicast and MBMS services of which some or all MBMS broadcast services are provided by SFN assigned with certain timeslots.

2. A TDD downlink-only carrier supports MBMS broadcast services via SFN.

3. A frequency division duplex (FDD) downlink-only carrier supports MBMS broadcast services via SFN.

According to specification developing principle, a newly developed specification should not impact on the previous version of the specification. To support MBSFN, the change request R2-071334 adds a new information element "MBSFN frequency list" in a system information block type 11 (SIB11) on a non-MBSFN carrier for notifying the UE of radio frequencies providing MBMS services transmitted on MBSFN. In addition, a dual receiver is employed in the UE, and thereby the UE needs to activate the second receiver of the dual receiver for receiving MBMS service notifications from the MBSFN carriers when the UE receives an MBMS service transmitted on a downlink-only carrier supporting the MBMS broadcast services via SFN. The change requests cause the following problems in such operation.

First, the change requests R2-071334 and R2-071331 do not disclose methods for distinguishing whether an MBMS service is transmitted on an MBSFN carrier or a non-MBSFN carrier. Thus, once an MBMS service is activated by an upper layer, the UE needs to monitor the MBMS service notifications from both the currently camped non-MBSFM carrier and the MBSFN carriers even though the MBMS service is actually transmitted on a non-MBSFN carrier. In this situation, monitoring the MBMS service notifications from the MBSFN carriers is needless for an MBMS service transmitted on a non-MBSFN carrier and therefore just causes unnecessary UE power consumption and degradation of receiving efficiency. More MBSFN carriers result in more power consumption.

Furthermore, when the UE receives an MBMS service transmitted on an MBSFN carrier, the UE needs to monitor the MBMS service notifications from multiple MBSFN carriers because more than one MBSFN carrier possibly is used for notification of the MBMS services. As a result, the UE has to switch between the MBSFN carriers regularly in order to get the up-to-date MBMS service notifications. Monitoring more MBSFN carriers causes more power consumption and degradation of receiving efficiency as well.

SUMMARY

The present invention therefore provides a method and related communications device for enhancing receiving efficiency of an MBMS service in a wireless communications system.

The present invention discloses a method for enhancing receiving efficiency of an MBMS service in a wireless communications system. The method includes setting an indicator for indicating whether an MBMS service is transmitted on a carrier of a single frequency network or not, and sending the indicator to a UE of the wireless communications system.

The present invention further discloses a communications device of a wireless communications system for enhancing receiving efficiency of an MBMS service. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes setting an indicator for indicating whether an MBMS service is transmitted on a carrier of a single frequency network or not, and sending the indicator to a UE of the wireless communications system.

The present invention further discloses a method for enhancing receiving efficiency of an MBMS service in a wireless communications system. The method includes determining the carrier frequency of a single frequency network for transmitting an MBMS service, and sending carrier information of the carrier frequency of the single frequency network to a UE of the wireless communications system.

The present invention further discloses a communications device of a wireless communications system for enhancing receiving efficiency of an MBMS service. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes determining the carrier frequency of a single frequency network for transmitting an MBMS service, and sending carrier information of the carrier frequency of the single frequency network to a UE of the wireless communications system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
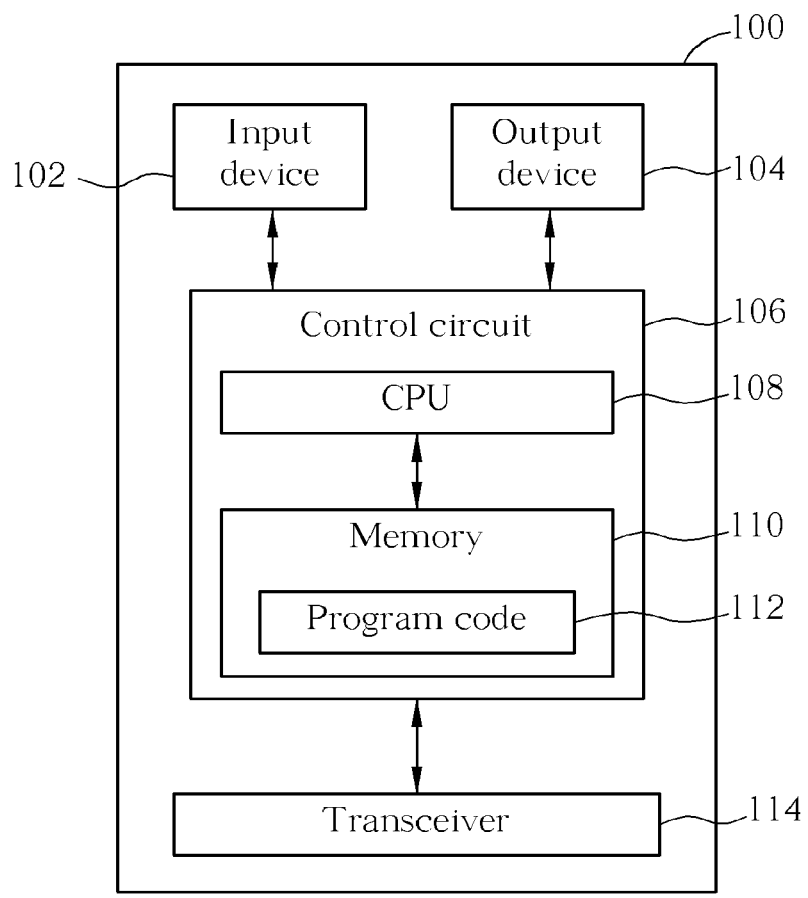
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
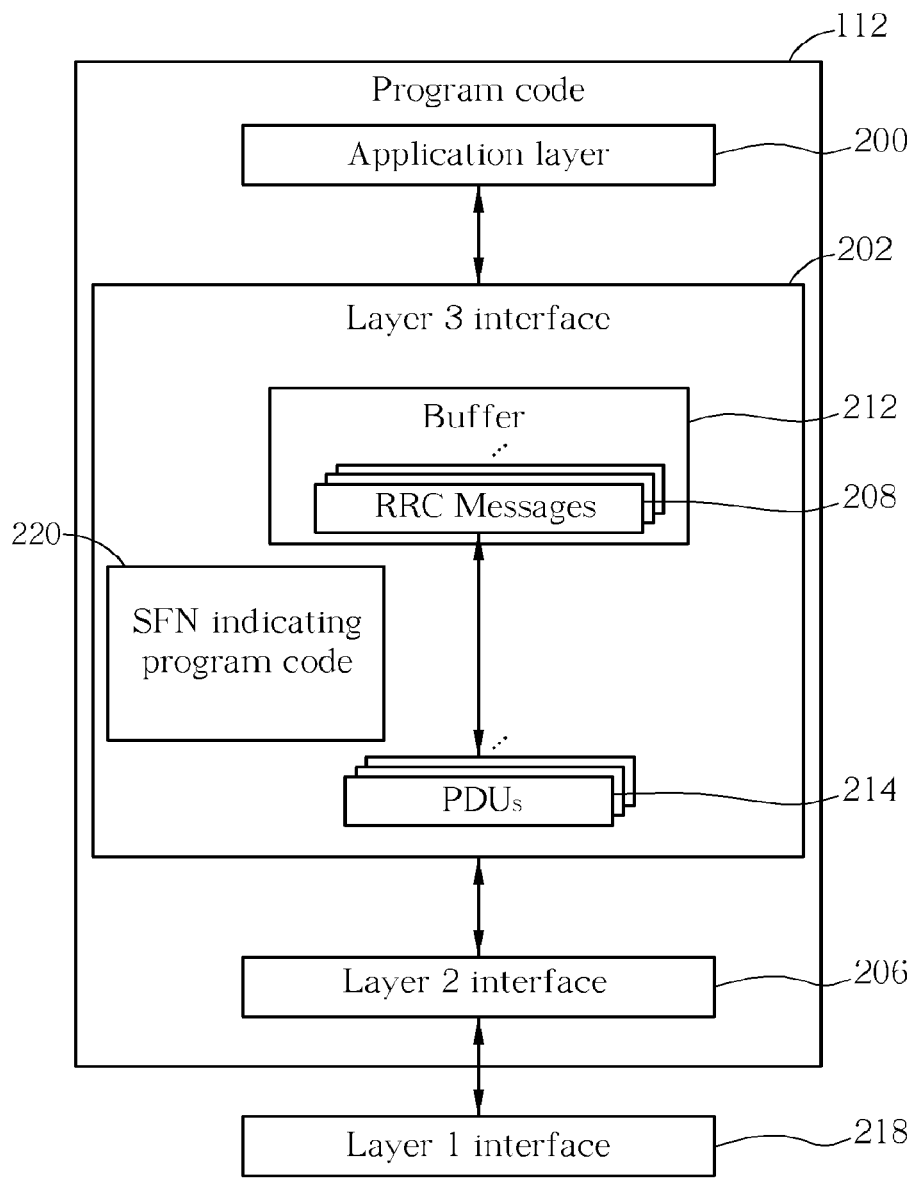
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a buffer 212 for storing radio resource control (RRC) messages 208 and accordingly generating RRC protocol data units (PDUs) 214. The application layer 200 provides control signals required by necessary procedures, which can be outputted by attaching the control signals to the RRC PDUs 214 for setting, modifying, or releasing the Layer 2 interface 206 and the Layer 1 interface 218, to establish, modify, or cancel data exchange channels.

The communications device 100 can provide MBMS services and, for improvement of MBMS receiving efficiency, the Layer 3 202 can transmit the MBMS services via a single frequency network (SFN) so as to reduce service interruption due to frequency switching during transmissions. In this situation, the embodiment of the present invention provides an SFN indicating program code 220 for indicating whether the SFN is used for MBMS service transmission, in order to enhancing receiving efficiency of an MBMS service for the UE.

Figure 3:
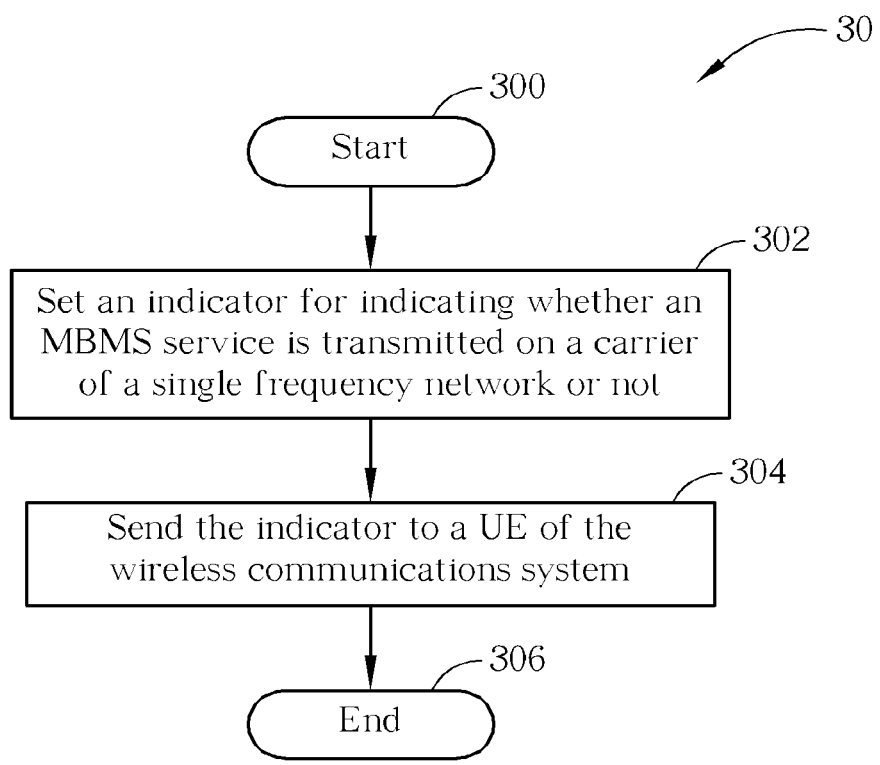
FIG. 3 is a flowchart diagram of a process according to an embodiment of the present invention.

Please refer to FIG. 3, which illustrates a schematic diagram of a process 30 according to an embodiment of the present invention. The process 30 is applied to enhance receiving efficiency of an MBMS service in a wireless communications system, and can be compiled into the SFN indicating program code 220. The process 30 includes the following steps:

Step 300: Start.

Step 302: Set an indicator for indicating whether an MBMS service is transmitted on a carrier of a single frequency network or not.

Step 304: Send the indicator to a UE of the wireless communications system.

Step 306: End.

According to the process 30, the embodiment of the present invention indicates whether the MBMS service is transmitted on an SFN carrier or a non-SFN carrier by setting an indicator. When the MBMS service is transmitted on the SFN carrier, the embodiment of the present invention sets the indicator to notify the UE that the MBMS service is transmitted on the SFN carrier. Therefore, the UE monitors a notification of the MBMS service from the SFN carrier according to the indicator. On the contrary, when the MBMS service is transmitted on the non-SFN carrier, the embodiment of the present invention notifies the UE that the MBMS service is transmitted on the non-SFN carrier by setting the indicator. Accordingly, the UE monitors a notification of the MBMS service from the non-SFN carrier according to the indicator.

In the prior art, no methods are disclosed to distinguishing whether an MBMS service is transmitted on an SFN carrier or a non-SFN carrier. In this situation, the UE has to monitor notification of the MBMS service from both the SFN and non-SFN carriers when the upper layer activates an MBMS service. Compared with the prior art, a network terminal in the embodiment of the present invention indicates what kind of carrier is used for transmission of the MBMS service by setting the indicator, and thereby the UE can obtain carrier information from the indicator. Therefore, the UE only needs to monitor the notification either from the SFN carrier or from the non-SFN carrier.

In the process 30, the network terminal preferably uses an MBMS user service announcement/discovery mechanism to send the indicator to the UE, and the UE stores the indicator in an MBMS_ACTIVATED_SERVICES variable.

Therefore, through the process 30, the embodiment of the present invention can prevent the UE from performing unnecessary carrier monitoring to save processing resources and power, thereby enhancing receiving efficiency of the MBMS service.

Figure 4:
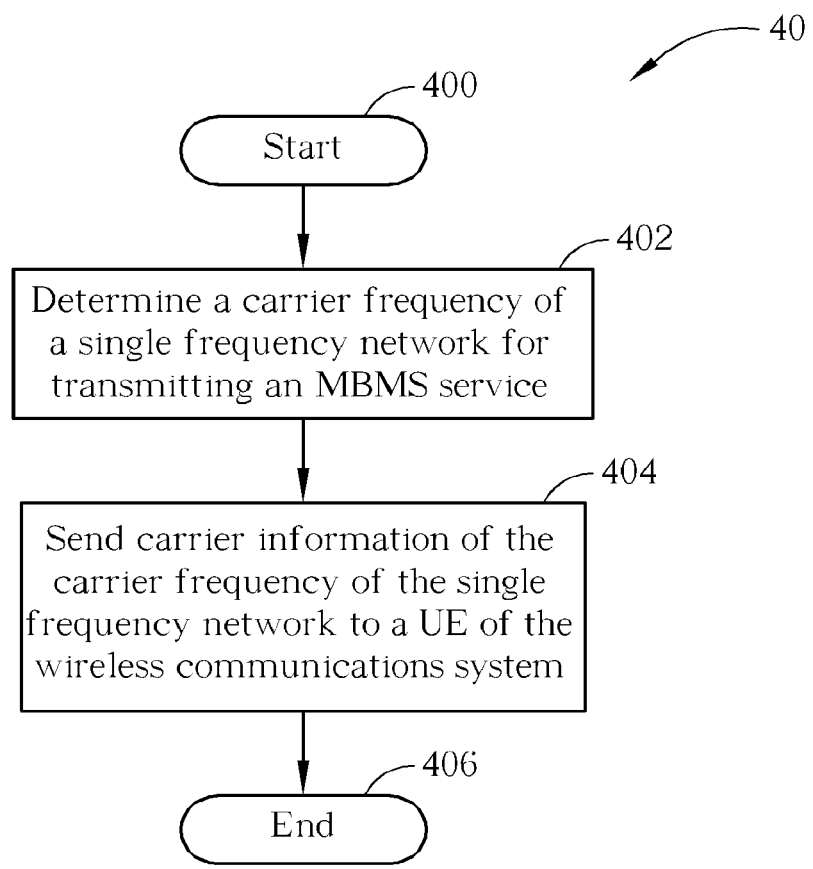
FIG. 4 is a flowchart diagram of a process according to another embodiment of the present invention.

Please refer to FIG. 4, which illustrates a schematic diagram of a process 40 according to an embodiment of the present invention. The process 40 is applied to enhance receiving efficiency of an MBMS service in a wireless communications system, and can be compiled into the SFN indicating program code 220. The process 40 includes the following steps:

Step 400: Start.

Step 402: Determine a carrier frequency of a single frequency network for transmitting an MBMS service.

Step 404: Send carrier information of the carrier frequency of the single frequency network to a UE of the wireless communications system.

Step 406: End.

According to the process 40, the embodiment of the present invention determines the carrier frequency of the SFN for transmitting an MBMS service and then sends the carrier information of the determined carrier frequency of the SFN to the UE. Accordingly, the UE monitors a notification of the MBMS service from the accurate carrier according to the carrier information to avoid unnecessary carrier monitoring.

In the process 40, the network terminal preferably uses an MBMS user service announcement/discovery mechanism to send the carrier information of the carrier frequency of the SFN to the UE, and the UE stores the carrier information in an MBMS_ACTIVATED_SERVICES variable.

In the prior art, when the UE receives an MBMS service transmitted on the SFN carrier, the UE needs to monitor the MBMS service notifications from multiple SFN carriers because not all the MBMS services are notified on one carrier. Compared with the prior art, a network terminal in the embodiment of the present invention determines the SFN carrier frequency and sends the corresponding carrier information to the UE so that the UE can only monitor the MBMS service notifications from the SFN carrier responsible for transmission of the MBMS service.

In conclusion, the embodiments of the present invention eliminate frequency switching in the UE by sending SFN carrier information corresponding to the network type and the carrier frequency. Thus, the present invention can avoid unnecessary waste of processing resources and power so as to enhance receiving efficiency of MBMS services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method to implement a user equipment (UE) in a wireless communication system, the method comprising:
   receiving an indicator, which indicates whether an MBMS (multimedia broadcast multicast service) service is transmitted on a carrier of a single frequency network (MBSFN) carrier or a non-MBSFN carrier, via an MBMS user service announcement and discovery mechanism; and
   determining whether to monitor a notification of the MBMS service on the MBSFN carrier or the non-MBSFN carrier in accordance with the received indicator.

2. The method of claim 1, wherein the indicator is stored in an MBMS_ACTIVATED_SERVICES variable.

3. A communications device used in a wireless communications system to implement a user equipment (UE), the communications device comprising:
   a control circuit for realizing functions of the communications device;
   a central processing unit coupled to the control circuit for executing a program code to operate the control circuit; and
   a memory coupled to the central processing unit for storing the program code;
   wherein the program code comprises:
      receiving an indicator, which indicates whether an MBMS (multimedia broadcast multicast service) service is transmitted on a carrier of a single frequency network (MBSFN) carrier or a non-MBSFN carrier, via an MBMS user service announcement and discovery mechanism; and
      determining whether to monitor a notification of the MBMS service on the MBSFN carrier or the non-MBSFN carrier in accordance with the received indicator.

4. The communications device of claim 3, wherein the indicator is stored in an MBMS_ACTIVATED_SERVICES variable.

\* \* \* \* \*